(12) United States Patent
Öhman et al.

(10) Patent No.: US 6,884,370 B2
(45) Date of Patent: Apr. 26, 2005

(54) MATRIX AND METHOD OF PRODUCING SAID MATRIX

(75) Inventors: Per Ove Öhman, Uppsala (SE); Lars Rune Lundbladh, Täby (SE)

(73) Assignees: Amic AB, Uppsala (SE); Gyros AB, Uppsala (SE)

( * ) Notice: Subject to any disclaimer, the term of this patent is extended or adjusted under 35 U.S.C. 154(b) by 0 days.

(21) Appl. No.: 10/211,185

(22) Filed: Aug. 2, 2002

(65) Prior Publication Data

US 2003/0047823 A1 Mar. 13, 2003

Related U.S. Application Data

(63) Continuation of application No. 09/554,530, filed as application No. PCT/SE99/01858 on Oct. 14, 1999, now Pat. No. 6,454,970.

(30) Foreign Application Priority Data

Oct. 14, 1998 (SE) .............................................. 9803507
Dec. 30, 1998 (SE) .............................................. 9804621

(51) Int. Cl.[7] .......................... B29C 33/38; B29C 33/42
(52) U.S. Cl. ....................... 264/1.33; 264/2.5; 264/225; 264/496; 425/174.6; 425/542; 425/346; 425/385; 425/403; 425/470; 425/810; 249/114.1; 249/134
(58) Field of Search ....................... 425/546, DIG. 244, 425/DIG. 13, 470, 403, 385, 810, 542, 346, 174.6; 264/404, 1.33, 2.5, 227, 225, 496; 249/114.1, 115, 134

(56) References Cited

U.S. PATENT DOCUMENTS

| 4,661,212 A | * | 4/1987 | Ehrfeld et al. ................. 205/75 |
| 4,793,953 A | | 12/1988 | Maus .......................... 264/2.5 |
| 4,861,437 A | | 8/1989 | Koop et al. ..................... 204/5 |
| 5,073,237 A | | 12/1991 | Bacher et al. ............... 264/320 |
| 5,149,607 A | * | 9/1992 | De Graaf et al. ............. 430/17 |
| 5,458,985 A | * | 10/1995 | Isono et al. .................. 428/601 |
| 5,630,902 A | | 5/1997 | Galarneau et al. ........ 156/379.8 |
| 6,165,391 A | * | 12/2000 | Vedamuttu .................. 264/1.33 |
| 6,454,970 B1 | * | 9/2002 | Ohman et al. .............. 264/1.33 |

FOREIGN PATENT DOCUMENTS

| EP | 0400 672 A2 | | 12/1990 | |
| GB | WO 97/27584 | * | 7/1997 | ............ G11B/7/26 |
| JP | 61165843 | | 7/1986 | |
| JP | 61214162 | | 9/1986 | |
| JP | 62189645 | | 8/1987 | |
| JP | 02215513 | | 8/1990 | |
| JP | 04139635 | | 5/1992 | |
| JP | 05116182 | | 5/1993 | |
| JP | 08090624 | | 4/1996 | |
| JP | 10034655 | | 2/1998 | |

OTHER PUBLICATIONS

Davy, D., "Century–Old Chemistry is Reborn in Moldmaking," *Modern Plastics International*, McGraw–Hill, Inc., Lausanne, CH, vol. 26, Feb. 1986, pp. 59–60, 62, XP000588381.

European Search Report dated Jan. 21, 2004 for EP 03 10 1762 completed on Jan. 14, 2004.

PCT International Search report; International Application No. PCT/SE99/01858, Jan. 19, 2000, pp. 1–3.

* cited by examiner

Primary Examiner—Joseph S. Del Sole
(74) Attorney, Agent, or Firm—Jenkens & Gilchrist, P.C.

(57) ABSTRACT

The invention relates to a matrix suitable for use in the replication of a plastic element having a positive microstructure, comprising a first wear-resistant layer that is supported by a carrier element, wherein the matrix comprises a heating means for supplying electrical heat energy through the wear-resistant layer or carrier element. The invention further relates to a plastic element producing machine and a method for the manufacture of a plastic element having a surface with a positive microstructure.

16 Claims, 3 Drawing Sheets

MATRIX AND METHOD OF PRODUCING SAID MATRIX

This is a continuation application of application Ser. No. 09/554,530 filed on Jul. 19, 2000 now U.S. Pat. No. 6,454,970, which is a 371 of PCT/SE99/01858, filed Oct. 14, 1999.

FIELD OF INVENTION

The present invention relates to a method of producing a matrix that can be used in a compression moulding, embossing, injection moulding and/or other plastic element-producing machine. In particularly the present invention relates to a matrix having a surface, or a part of said surface, which is provided with a negative microstructure that can be replicated as a positive microstructure, on a surface of a plastic element, such as a compact disc (CD) formed in such a machine.

The invention also relates to a matrix manufactured by said method, the use of said matrix to form a plastic element and the plastic element so formed.

DEFINITIONS

In the following, the expression "positive surface structure" shall be understood to mean the surface structure (including topographic surface features such as microstructures or plane surfaces or parts of surfaces) that appears on a plastic element produced in a plastic element-producing machine, and that by "negative surface structure" is meant the inverse of the positive surface structure, i.e. the surface structure exhibited by a matrix used in such a machine.

By plastic composite is meant a curable mixture of polymeric material and a filling material, where the filler is normally present in surplus.

There is defined in the following description a matrix first wear surface that is formed on a first wear layer, and a matrix second wear surface that is formed on a second wear layer.

The first wear surface is the surface of the matrix that carries a microstructure and that faces towards the manufactured plastic element, while the second wear surface is the surface of the matrix, also referred to as the rear side, which is preferably planar and lies in abutment with the corresponding planar support surface of a mould half. It will be understood that these latter two surfaces need not necessarily be planar but that they shall connect with one another so as to be able to take-up forces generated during the moulding or casting process e.g. they can have complementary shapes.

DESCRIPTION OF THE BACKGROUND ART

In respect of replicating microstructures on plastic elements produced in a machine of the kind defined in the introduction, it is known to produce first an original master in some suitable way, and then to produce a matrix for use in said machine on the basis of this master. Matrices of this kind can be produced by coating a master or an original that has a positive microstructure on one surface with a metal layer or a metallic coating and removing the negative-microstructured metal layer from the master to thereby obtain a metal plate that can serve as a matrix in the compression moulding, embossing and/or injection moulding press. Normally each mould half can have its own matrix and a flowing, hot (approximately 400° C.) plastic mass is pressed under high pressure into a delimited mould cavity formed by cavities in brought together mould halves The flowing hot plastic mass is then allowed to solidify (at approximately 140° C.) between the brought together mould halves before the mould halves are opened and the solidified element can be pressed out.

Lithographic processes, in particular lithographic processes that have been developed primarily for use in the micro-electrical field, are an example of known methods for producing a master. One of these methods is based on etching a semiconductor surface and/or depositing material thereon. Other methods are based on the removal of parts of material with the aid of a laser, so-called laser ablation, with the aid of traditional NC-machines, with the aid of precision-controlled, high-speed diamond millers, with the aid of electric discharge machining (EDM), wire EDM and/or some other suitable method.

Such originals or masters are normally produced from a material that is chosen to be suitable with respect to a given machining process.

In the case of lithographic processes, the material is most often a sheet of silicon, glass or quartz, whereas in the case of laser ablation the material most often used is a sheet of plastic composite and/or a polymeric material.

In the case of metal processing methods, plastics and soft metals may both be suitable.

It is well known that the requirements of a given replication process on a given material in the matrix and the plastic element are not the same as the requirements that must be met with respect to the original or the master. For instance, with respect to injection moulding of such plastic elements where one or more surface parts shall present a microstructure, one or both of the mould halves of the machine and the matrix used therein must be made of a stable material that can withstand the high pressures that occur during the course of manufacture, and which will not be worn down unnecessarily quickly by the thermal and mechanical wear-and-tear to which the mould halves and the matrix are subjected during the casting or moulding process.

It is known to produce such matrices, and primarily matrices for use with microstructure, by transferring the shape and surface structure of a master to a metal plate which can then serve as a matrix.

One manufacturing method is based on first producing a master on a surface of a glass plate, a semiconductor plate or a metal plate, coating the surface with a light-sensitive layer and exposing selected surface sections of this light-sensitive layer through the medium of a laser or the like, and washing and cleaning the selected surface sections. A metal layer is applied to the exposed and cleaned surface of the master, through the medium of a sputtering process, a vapour deposition process, and/or through the medium of a plating or cladding process, for the length of time required to form a metal plate. The metal plate can then be removed from the master. The metal plate has a first surface which exhibits a negative microstructure which is intended to face towards the inside of a mould cavity. The metal plate can be used as a matrix after further machining, i.e. smoothing, of a second surface that faces towards the mould half in the machine.

It is this method that is presently used in the manufacture of a matrix used in an injection moulding press for the production of optical discs, e.g. CD discs.

Other ways of producing a matrix or a master include: an electrically insulating microstructured disc serving as a master or matrix can be coated with a thin metal layer by means of a sputtering process and/or by vapour deposition; an electrically conductive microstructured disc or layer that functions as a master or matrix can be coated with a much thicker metal layer by means of a plating or cladding process; a disc intended to function as a matrix can be coated with a thin electrically conductive layer, such as a nickel, silver, or gold layer or some like metal layer, by means of a plating or cladding process.

It is also known to connect a metal layer electrically and to submerge a disc in a solution that comprises among other things, metal ions, and to pass an electric current through the solution onto the disc or master unit and therewith cause metal ions to precipitate as pure metal onto the surface of the disc. In this way a structure can be produced in metal that has the inverse function of the microstructure on the master.

It has been found that the above method can be readily applied in respect of flatter structures, particularly when the depth of the microstructure is limited to, or smaller than, about 0.2 μm.

It has been found that in forming a matrix the metal build-up on the microstructure-carrying surface of a master results in minor defects or irregularities on the rear side of the matrix, which irregularities are caused by the microstructure, and that it is necessary to subsequently smooth said rear side in order for it to lie in effective abutment, e.g. flat, on a flat surface on the mould half that supports it in the pressing machine used.

Practical applications have shown that in the case of deeper structures in the master microstructure, the master pattern will be embossed on the rear side of the matrix or metal plate.

Various procedures are known for reducing or eliminating this problem.

A first measure is to apply an extremely thick layer of metal by means of a plating process or some equivalent process. The resulting plate which is intended to serve as the matrix will be strong and stable. The plate can then be placed in equipment in which the metallic rear side of the plate can be smoothed down or levelled mechanically, such as by a grinding, polishing and/or lapping process, while still retaining sufficient strength to serve as a matrix.

The process of applying a truly thick layer of metal as in the case of deeper microstructures takes a relatively long time to achieve, for instance it will take from 10 to 20 hours to apply a nickel cladding which is a few millimetres thick.

Furthermore, it takes considerable time to grind and/or polish down the metallic rear side to a smooth surface. Moreover, the adhesion between the master microstructure and the conductive metal layer in the matrix must be capable of withstanding the tensions that are generated in the interface therebetween.

The use of available grinding and/or polishing equipment for smoothing the metallic rear side to a flat surface also requires the master to be very stable.

Various methods are known to counteract the problem arising from a defective or irregular and uneven rear side, by applying different plating processes so as to be able to level out the growth of the metal layer against a planar metallic rear side.

One known method in this respect uses a pulsed field instead of a direct current with constant field. However, in principle, a metallic layer takes longer to grow with a pulsed field than with a direct current. Using suitably adapted parameters and chemical compositions, this method enables the deep microstructure parts to be coated and built-up more quickly than the shallower microstructure parts, meaning that the deep structures will be overgrown and the metallic rear side will become relatively flat.

Practical experience has shown, however, that the metallic rear side must still be smoothed down, by grinding, polishing and/or lapping said surface.

With respect to the tine consumption of the two methods involving a pulsed field and a constant field, the coating time in the first method will be longer than the coating time in the latter method, whereas the time taken to smooth down said surface will be shorter in the first method than in the second method.

When manufacturing plastic elements with a positive surface related microstructure, different means and arrangements are known for supplying the matrices belonging to the mould halves, and consequently the matrices in general, with alternating heating and cooling.

Heat is applied in order to thereby make the composite plastic or the plastic material used more easily flowing against the surface of the matrix in order to in this way be able to improve the replicating of the microstructure.

It is also known to apply cooling, such as a cold fluid, in the form of oil or water, or gas, in the form of air, to the mould halves of the matrix in order to thereby, immediately after the finishing of the manufacturing process in the machine, to, via the matrix, cool the plastic element down to the solidification temperature so that the positive surface structure belonging to the plastic element remains intact.

It is herewith obvious that because of the matrices' and the mould halves' large heat storing capacity, large heat and cooling transport system are required, which lead to a consequently slow manufacturing speed.

Since the manufacturing speed is extremely dependent on the time taken to heat up the matrix surface, by a heat supply to the mould halves, during the injection process and the time for a subsequent cooling of the cast element via the matrix surface and the mould halves, different measures have been suggested.

Thus, it has been suggested to form channels in the mould halves and supply hot water respectively cold water through these, but because of the high pressure which exists inside the mould cavity it is technically difficult to position them optimally close to the matrix.

With the intention of further reducing the cycle time it is previously known to use a heat insulating layer between the matrix and the mould halves (see—Optimizing Pit Replication Through Managed Heat Transfer—by Thomas Hovatter, Matthew Niemeyer and James Gallo, published by GE Plastics, Pittsfield, Mass. USA).

SUMMARY OF THE PRESENT INVENTION

Technical Problems

When taking into consideration the technical deliberations that a person skilled in this particular art must make in order to provide a solution to one or more technical problems that he/she encounters, it will be seen that on the one hand it is necessary initially to realise the measures and/or the sequence of measures that must be undertaken to this end, and on the other hand to realise which means is/are required in solving one or more of these problems On this basis, it will be evident that the technical problems listed below are highly relevant to the development of the present invention.

When considering the present state of the art as described above, it will be evident that a technical problem resides in providing a simple method of producing a matrix that can be adapted for use in a compression moulding, embossing and/or injection moulding press, where the matrix is provided on one surface with a negative microstructure that can be replicated in the machine as a positive microstructure on a surface part of a produced plastic element, through the medium of a plastic composite or plastic material, and therewith obtain an inexpensive matrix that has a sharply defined microstructure.

Another technical problem is one of providing with the aid of simple means conditions that will enable the matrix to be given a microstructure-related first wear-resistant surface formed on a first wear-resistant layer which has an adaptable and relatively high abrasion resistance.

Another technical problem is one of providing with the aid of simple means and measures conditions which will enable the matrix to be built-up of at least two layers, a thin first wear-resistant layer presenting said microstructure-related surface, and a layer which stiffens or reinforces said thin wear-resistant layer, this latter layer being a thicker layer and which is referred to hereinafter as the carrier element.

Still another technical problem is one of providing with simple measures conditions that will enable the material used in the first thin layer and the material used in the thick layer or carrier element to be chosen with such properties and/or thicknesses as to fulfil predetermined requirements and conditions.

Another technical problem is one of realising the significance of and the advantages that are gained with enabling the matrix to be produced by metal coating, with the aid of a metal coating process, a master that has on one surface a positive microstructure, and coating this thin metal layer with a plastic composite so as to form said carrier element.

Another technical problem is one of producing with simple means and measures a matrix which is formed substantially or exclusively from a plastic composite and which can be used in a machine, where the time taken to produce the matrix from a master has been considerably shortened, among other things by being able to eliminate or at least substantially reduce the time taken to form on the plastic composite a flat rear side of the matrix for close abutment of said rear side with one of the two mould halves of said machine.

Yet another technical problem resides in realising the significance of producing the matrix from a master and to apply to the surface-carried positive microstructure a thin metal layer and to permit said metal layer to show on the rear side of the microstructure irregularities that correspond essentially to said microstructure, and to realise the advantages of filling said irregularities with a supportive plastic composite which, when cured forms a supportive sheet-like carrier element, instead of building up the entire matrix with a thick metal layer.

Another technical problem is one of realising the significance of filling-out said irregularities with a chosen plastic composite and forming the carrier element in a special mould cavity.

Still another technical problem is one of realising the significance of and the advantages gained by, forming said plastic composite, and therewith said carrier element, from a mixture of plastic material or polymeric material and a filler material such as quartz-filled or metal-filled epoxy or silicone polymer.

Another technical problem is one of realising the significance of, and the advantages that are gained by, using a plastic composite and therewith a carrier element that has a coefficient of linear expansion and/or a thermal conductivity and/or a heat capacity that is adapted for a given process carried out in the machine, and also to the design of said machine.

In respect of this application, a technical problem resides in utilising a specially selected curing process so as to impart to the chosen plastic composite a hardness and/or hardening time which is dependent on the application concerned, by applying heat to chosen parts of the plastic composite or plastic mass and/or irradiating the plastic composite or said mass with UV-light, or by using a bicomponent plastic composite.

Still another technical problem is one of realising the significance of providing a first wear-resistant layer and/or a metal layer thin, and to select a plastic composite, and therewith a carrier element, that has a low heat transfer capacity so that the plastic mass pressed through the machine and between the mould part will be kept warm.

Another technical problem is one of realising the significance of and the advantages that are gained and the dimensioning rules required with respect to the application of a second wear-resistant layer on the carrier element surface distal from the microstructured surface of said metal layer.

Another technical problem is one of realising the significance of forming said second wear-resistant layer from a material that has low friction qualities against the flat surface of said mould half and high abrasive resistance, such as titanium nitride or diamond-like-carbon (DLC).

Still another technical problem is one of realising the significance of applying said thin metal layer to said master or original when said original consists of an electrically non-conductive material, by means of a sputtering process and/or by means of vapour deposition, and applying said thin metal layer by means of a metal plating process when said material is electrically conductive.

Another technical problem is one of choosing the thickness of the metal layer within predetermined limits on the basis of the application performed in the injection moulding press.

Still another technical problem is one of realising the significance of and the advantages that are to be gained by creating conditions such as to greatly simplify smoothing-down of the rear side of the matrix and of the carrier element and/or totally eliminating the need of such smoothing.

There is a technical problem in, in a machine, for the manufacture of plastic elements, being able to form an arrangement which with the minimal possible application of energy shall be able to keep the negative surface structure of the matrix hot during the moulding process and thereby ensure a complete filling of the mould cavity before the plastic element is cooled.

There is furthermore the technical problem of how, with the help of simple means and measures, the cycle time can be reduced for the manufacturing of an element in a machine of the type mentioned in the introduction.

There is also a technical problem within a machine for the manufacture of a plastic element, to be able to form an arrangement which with the smallest possible application of energy is able to quickly cool the negative outer structure of the matrix to a temperature corresponding with and somewhat under the solidification temperature for the plastic mass.

It is a technical problem to, with simple measures, be able to form such conditions within the matrix that a desired heating during the moulding sequence takes place inside the matrix and that the heated matrix serves as a barrier against a cold mould half and that a desired cooling occurs only through simply disconnecting the heating sequence.

It should moreover be seen as a technical problem to be able to arrange conditions in order to achieve an electrically controlled heating of the negative surface structure of the matrix.

There is in this connection a further technical problem in at with simple measures and with the use of one or more layers belonging to the matrix being able to offer a simple and, if necessary, even locally acting heating in order to in that way be able to increase the replication capability.

It is moreover a technical problem to, via a matrix related arrangement, be able to form a locally acting intensive heating in order to within the selected localities belonging to the mould cavity be able to offer a better filling capability.

Then there is also a technical problem in for this purpose being able to provide simple means and actions whereby an application of electrical heat energy to the whole of the matrix's surface structure can be presented and furthermore, when necessary, a locally acting increased application of electrical heat energy can be offered.

Then there is a technical problem in, with simple means, being able to provide such conditions that said electrical heat energy shall be able to be applied, via, or immediately beside, the negative surface structure belonging to the matrix, through applying a voltage to one and the same layer for an adapted current distribution within said layer which can be conducting or semi-conducting.

There is a technical problem in with simple measures being able to form conditions for being able to offer a varying heat production, which only through selecting the thickness for a conducting or semi-conducting layer with a thinner layer for a higher heat production and vice versa.

Then there is a technical problem in with simple means being able to form such conditions that said electrical heat energy and its local distribution shall be able to be applied, via or immediately beside, the negative surface structure belonging to the matrix through applying a voltage to two adjacent conducting layers for a current distribution within an intermediate semi-conducting layer.

It should be seen as a technical problem to with simple measures be able to form conditions for a varying heat production through selecting thinner thickness and/or lower conductivity in delimited surface regions where a higher temperature is desired and vice versa.

There is also a technical problem in being able to realise the significance of and the advantages connected with using said layer having a negative surface structure and/or a layer supporting this layer when the latter consists of an electrically conducting or electrically semi-conducting material.

There is also a technical problem in being able to realise the significance of selecting the layer having the negative surface structure belonging to the matrix from a material, normally a metal material, with a resistivity of between 0.025 and 0.12 (ohm×sq mm/m).

There is also a technical problem in being able to realise the significance of and the advantages related to allowing the layer having the negative surface structure belonging to the matrix be supported by a layer with a resistivity of 0.03 and lower.

There is also a technical problem in being able to realise the significance of and the advantages connected with allowing one or more supporting layers to be made of a heat producing layer such as an electrically conducting polymer.

It should especially be seen to be a technical problem to be able to realise the significance of the advantages related to that at least one, of a plurality of available layers, is selected to have different thicknesses, thicker at a section which requires lower heat energy and thinner at a section which requires higher heat energy.

The present invention specially relates to an application where the layer having the negative surface structure relating to the matrix is in the form of a microstructure and therewith being able to realise the significance of allowing the heat production be adapted at selected cross-sections to be higher than at other surface sections, in order to in this way similarly increase the replication accuracy and mould filling.

There is also a technical problem in being able to realise the significance of and the advantages related to allowing the heat energy be applied to a circular disk through applying a voltage between a peripheral surface part of a selected layer and a central hole.

Furthermore it should be considered to be a technical problem in being able to realise the significance of allowing the electrical heat energy be applied to a circular disk through the application of voltage to a peripheral surface part for different layers with low resistivity and by heat production within an intermediate positioned layer with a high resistivity.

Solution

With the intention of solving one or more of the aforesaid technical problems, the present invention takes as its starting point a method of producing a matrix that includes on one surface a negative microstructure which can be replicated in an injection moulding press as a positive microstructure on a prepared plastic element, from a plastic composite or a plastic material.

The invention is based on the concept of enabling said matrix to be produced by covering a master or an original that has a positive microstructure on one side thereof with a layer of covering material.

It is now proposed in accordance with the invention that there is applied to the positive microstructure on the surface of said master a thin wear-resistant layer that functions as a first wear-resistant surface, said layer presenting irregularities that correspond essentially to said microstructure, and then filling-out said irregularities with a plastic composite, such as to form a carrier element or backing element for said first wear-resistant layer.

By way of proposed embodiments that lie within the scope of the inventive method, it is proposed that said plastic composite is applied to level out said irregularities in a mould cavity.

It is also proposed that the plastic composite, and therewith the carrier element, is comprised of a polymeric material and a filler material, such as quartz-filled or metal-filled or carbon fibre-filled or other fibre- or particle-filled epoxy polymer or silicone polymer.

It is also proposed that the plastic composite, and therewith the carrier element, have a coefficient of linear expansion and/or a thermal conductivity and/or a heat capacity adapted for a given process carried out in a machine and also to the design of said machine.

It is also proposed that the plastic composite is cured in a manner suitably adapted for injection moulding, such as by applying heat and/or irradiation with UV-light.

The plastic composite may also be a bicomponent composite.

It is also proposed in accordance with the invention that a plastic composite, therewith the carrier element, located beneath a hard wear-resistant layer serving as a first wear-resistant surface has an adapted thermal conductivity and/or an adapted heat capacity so that the plastic mass pressed forwards in the machine can be kept warn while achieving short cycle times at the same time.

It is also proposed in accordance with the present invention that the plastic composite, and therewith the carrier element, can be coated with a second wear-resistant layer on the surface that lies distal from the first wear-resistant surface, so as to reinforce the matrix construction against abrasive wear.

This second wear-resistant layer may be comprised of titanium nitrate or DLC.

It is also proposed in accordance with the invention that said thin first wear-resistant layer is comprised of a metal layer and that said metal layer shall be applied by a sputtering process and/or a vapour deposition process, or a metal plating process.

It is also proposed that the thickness of the first wear-resistant layer, such as the metal layer, is carefully chosen with respect to application and with respect to the design of the injection moulding press.

The invention also provides a matrix, which is adapted for use in compression moulding machine, an embossing machine and/or an injection moulding press.

It is particularly proposed in accordance with the invention that the microstructured surface of the matrix shall be comprised of a thin, first wear-resistant layer, such as a metal layer, and that said first wear-resistant layer is preferably supported by a carrier element.

In accordance with proposed embodiments that lie within the scope of the inventive concept, the carrier element is conveniently comprised of a thick plastic composite layer.

In this regard, it is proposed that the carrier element be comprised of a plastic composite comprised of a polymeric material mixed with a filler material, such as a quartz-filled or metal-filled or other fibre- or particle-filled epoxy polymer or silicone polymer.

It is also proposed that the carrier element will be comprised of a plastic composite that has a coefficient of linear expansion and/or a thermal conductivity and/or a heat capacity adapted to a chosen process and to a chosen design of the injection moulding press.

It is particularly proposed that the carrier element is comprised of a plastic composite that can be cured by applying heat and/or irradiating said composite with UV-light. Alternatively, the plastic composite may be a bicomponent composite.

The carrier element and the thick plastic composite layer may also be comprised of a plastic composite that has a pronounced low thermal conductivity e.g. less than 2 W/m/°K.

It is particularly proposed that the carrier element can be strengthened, primarily from an abrasion aspect, for instance with the aid of a second wear-resistant layer on the surface distal from the metal layer surface. This reinforcing second wear-resistant layer may be comprised of titanium nitride or DLC in this case.

It is further proposed that heating means be provided for supplying heat energy to said matrix.

It is also proposed that said heating means should be formed by the supplying of electrical heat energy to the whole, or parts, of just the matrix, that said electrical heat energy is supplied via or immediately beside the outer layer belonging to the matrix and that said layer and/or the supporting layer consist(s) of an electrically conducting and/or electrically semi-conducting material.

As a suggested embodiment, falling within the scope of the invented concept, it is taught that the layer belonging to the matrix is selected from a material with a resistivity of between 0.025 and 0.12 Ohms×mm$^2$/m.

It is further taught that said layer belonging to the matrix is supported by a further layer with a resistivity of 0.3 Ohms×mm$^2$/m or less.

It is further suggested that such a supporting layer should be formed from a heat-producing layer.

The supporting layer can also consist of a material with a higher resistivity and positioned intermediate two layers having low resistivity.

The invention further shows that such an intermediate positioned layer can be selected to have different thicknesses, thicker at surface sections that require low heat energy and thinner at surface sections that require high heat energy.

The invention specially teaches the application of that the layer having the negative surface structure belonging to the matrix can have the form of a microstructure and therewith requires that the heat production should be adapted so that it is greater at selected surface sections than at other surface sections in order to thereby increase the replication accuracy and mould filling.

The electrical heat energy can be supplied through applying a voltage to peripheral surface parts for a selected layer.

Alternatively the electrical heat energy can be supplied through applying a voltage to peripheral surface parts of different layers having low resistivity in order to produce heat within an intermediate positioned layer having a high resistivity.

Advantages

Those advantages that are primarily afforded by a method of producing a matrix adapted for use in a compression moulding machine and/or an injection moulding press in accordance with the present invention reside in the creation of conditions which enable the matrix to be produced more simply. In particular, this can be achieved by applying a thin first wear-resistant layer to the positive microstructure on one side of a master and thereafter applying a plastic composite in order to fill-out irregularities in said wear-resistant layer and to form a carrier element.

This eliminates, or at least substantially reduces, the need to smooth down the plastic rear surface of the matrix in order to obtain a flat matrix surface which can abut a flat support surface of a mould body in the machine used.

The heat transfer capacity and/or the heat capacity of the matrix can also be adapted so as to enhance the replication capacity in the production process, such as the embossment process and/or the injection moulding process, by virtue of the fact that the forming plastic material will not freeze as soon as it comes into contact with the microstructured surface of the matrix, but is able to remain fluid for as long as it takes to replicate the matrix microstructure effectively on the formed plastic element.

The matrix in accordance with the present invention, enables the thickness of an applied first wear-resistant layer, such as a metal layer, to be greatly reduced, thereby reducing the production time. Additionally, through the selection of a supportive plastic composite for forming a carrier element, an adapted carrier surface can be formed, optionally with a wear-surface reinforcement, which can also function as a heat insulator and/or a heat storage between a hot pressed plastic mass and the matrix-associated mould part.

Further advantages such as being able to, with simple measures, offer a higher replication accuracy than previously and a more simple mould filling of an outer structure belonging to a plastic element, can be obtained through supplying electrical heat energy to the whole or selected parts of the matrix.

The application of heat energy to the outer structure of the matrix occurs in the first place in order to be able to counteract or eliminate the matrix and mould half cooling effects on the heated plastic mass, when it is squeezed in between the mould halves in the machine for the manufacturing of plastic elements.

Through the utilised and supplied electrical heat energy being concentrated to the outer layer of the matrix or in the vicinity thereof the matrix and the mould halves can be given a temperature which is adapted for a quick cooling down of the plastic part by disconnecting this supply of heat energy.

The primary characteristic features of an inventive method and the primary characteristic features of an inventive matrix are set forth herein.

BRIEF DESCRIPTION OF THE DRAWINGS

The invention will now be described with reference to an embodiment of an injection moulding press at present preferred and in which an inventive matrix can be used, and with reference to a method of producing the matrix and to a matrix manufactured by said method that has features significant of the present invention, with reference to the accompanying drawings, in which.

DESCRIPTION OF EMBODIMENTS AT PRESENT PREFERRED

Figure 1:
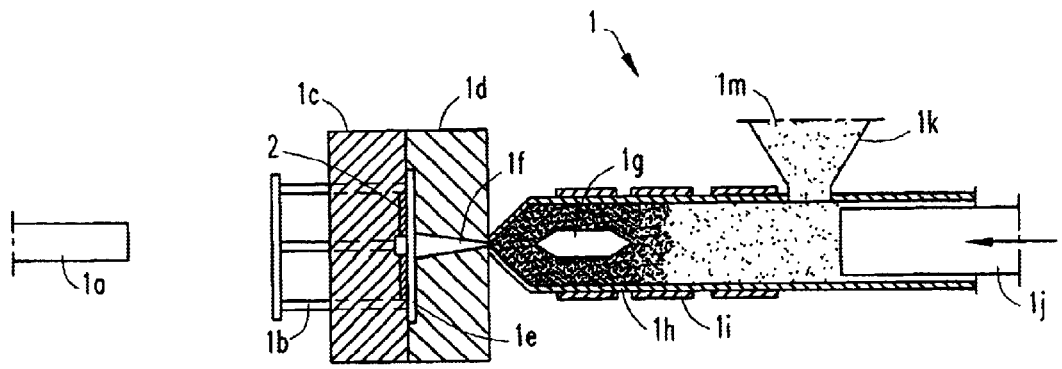
FIG. 1 is a schematic side view of part of an injection moulding press and shows two mould halves in mutually co-operating positions.

The present invention relates to a method of producing a matrix 2, in particular a matrix 2 adapted for use in a compression moulding, embossing, injection moulding and/or other plastic element-producing press 1

One surface of the matrix 2 is given a negative microstructure 2a that can be replicated as a positive microstructure 3a on a plastic element 3 in the injection moulding press 1.

The method by means of which the matrix 2 is produced will be described in more detail below with reference to FIG. 6.

For the sake of simplicity, the following description assumes that solely the moveable mould half is provided with a matrix 2 that has a microstructure 2a, although the person skilled in this art will realise that the fixed mould half may also be provided with such a matrix.

Figure 2:
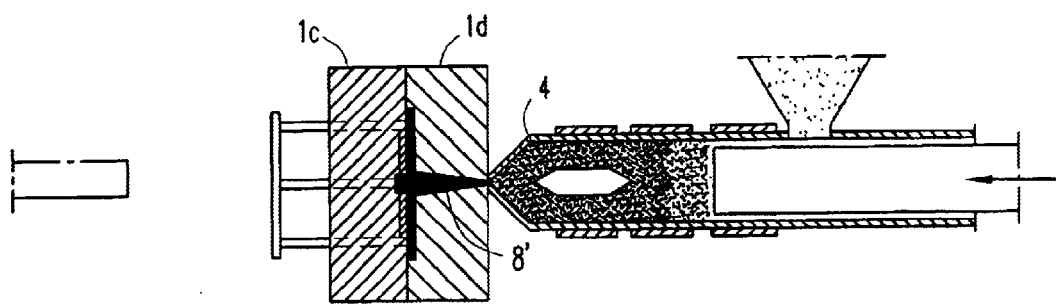
FIG. 2 illustrates the machine of FIG. 1 in a stage of operation in which heated plastic mass in the form of a plastic composite is being pressed through a fixed mould half and into a cavity formed between two mould halves, for pressure-casting or die casting of a flat plastic element.
Figure 3:
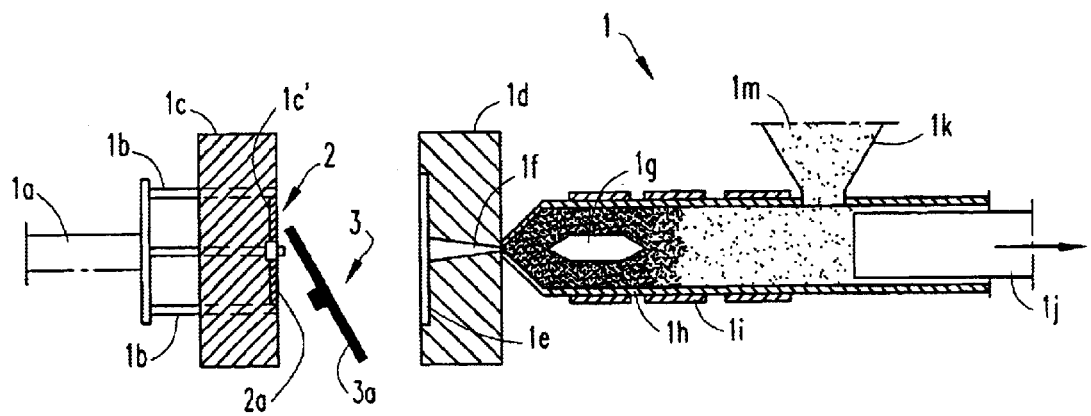
FIG. 3 illustrates the injection moulding press where a moveable mould half has been moved away from a fixed mould half and the shaped flat plastic element has been ejected from the moveable mould half.

Thus, FIGS. 1–3 illustrate schematically an injection moulding press I that includes an ejector rod 1a, a number (3) of ejector pins 1b, a moveable mould 1c and a fixed mould 1d.

The moveable mould half 1c and the fixed mould half 1d define therebetween a cavity 1d whose shape conforms to the shape of a flat, injection moulded plastic element 3, said cavity including a cavity inlet 1f in the shape of an intake.

FIG. 1 also illustrates the use of a "pineapple" 1g, a cylinder wall 1h, a heating element 1l, an injection ram 1j and a filling funnel or hopper 1k for granulated or powder material 1m.

FIG. 2 shows how a heated, flowing plastic mass or plastic material 1p surrounds the "pineapple" 1g and is pressed through the cavity inlet 1f by the plunger 1g and into the cavity 1e with the mould halves 1c, 1d brought together in the position shown in FIG. 1.

FIG. 3 shows that the moveable mould half 1c is moved away from the mould half 1d to a given position in which the flat plastic element 3 is parted from the moveable mould 1c with the aid of the ejector rod 1a and the ejector pins 1b, so as to fall out of the mould half 1c.

Figure 4:
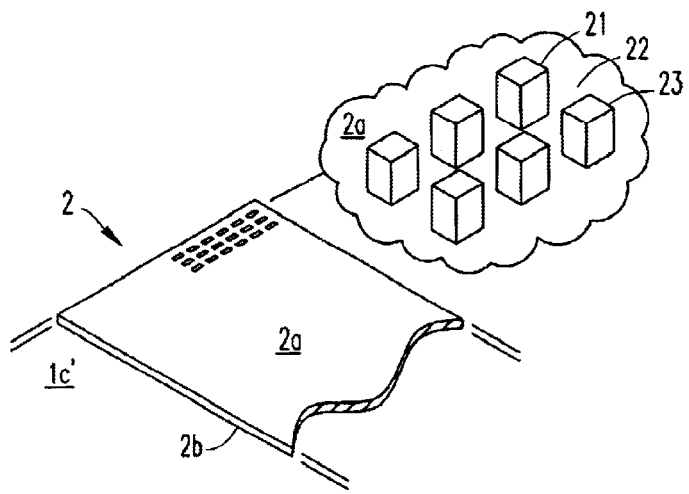
FIG. 4 illustrates in perspective a microstructured matrix that can be placed in the moveable mould half, a simplified enlarged view of part of the microstructure also being shown in FIG. 4, although not according to scale.

FIG. 4 is a very simplified, perspective view of a plate-like matrix 2 which includes an upwardly facing microstructure 2a on one side thereof.

This microstructure is normally a very complex structure. However, for the sake of ease of illustration of the present invention, an extremely simplified and enlarged embodiment of this microstructure is also shown in FIG. 4, but not according to scale.

For the sake of simplicity and clarity, the following description will be concerned solely with a microstructure that includes a first raised part 21, an intermediate cavity or hollow 22 and a second raised part 23.

The matrix 2 is thus provided with a negative microstructure 2a on one surface thereof.

The matrix 2 has the form of a disc or a plate that has a flat undersurface 2b, normally a flat machined surface 2b, which rests on a flat supporting surface 1c' in the moveable mould half 1c.

It is important in this respect that the matrix has a flat (or curved) surface 2b which is able to rest against a flat surface 1c' (or a complementary curved surface) on the mould half 1c, such that the matrix 2 will be able to withstand the pressure forces that are generated during the process of manufacture, for instance during an injection press-moulding process.

Figure 5:
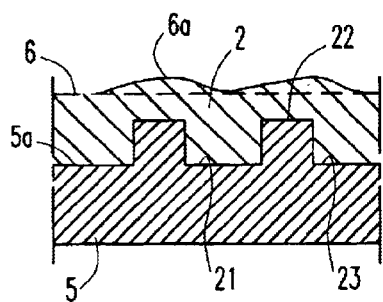
FIG. 5 is a sectional side view illustrating one example of a method of manufacturing a prior art matrix.

FIG. 5 is a cross-sectional view of part of a known matrix 2, taken through the raised parts 21 and 23 and the cavity 22.

In the known method illustrated in FIG. 5, the matrix 2 can be produced by coating a surface with metal through, for example, a metal plating process, to provide a master that has a positive microstructure on one side.

By means of this plating process, or corresponding process, metal layer upon metal layer are built up on the microstructure surface part 5a of the master, such that a first metal layer will cover even a lowest point in the microstructure on said surface part 5a.

Because such a plating process will result in a metal layer whose upper surface will be irregular owing to the underlying surface structure 5a, it is necessary to continue the plating process and form metal layer up on metal layer until a combined thickness is reached which will exceed, over the whole of said surface, a predetermined value or plane, indicated by 6 in FIG. 5.

In the case of the earlier known method, it is necessary to grind away all of the metal material 6a applied over the surface 6, in one way or another.

Plating processes for applying layers of the thickness concerned in this respect are very time-consuming. Grinding of the surplus metal material 6a down to the plane 6 is also very time-consuming.

According to the present invention, a matrix 2 is produced with the aid of a master 5 that may be produced in the same way as the master 5 shown in FIG. 5.

Figure 6:
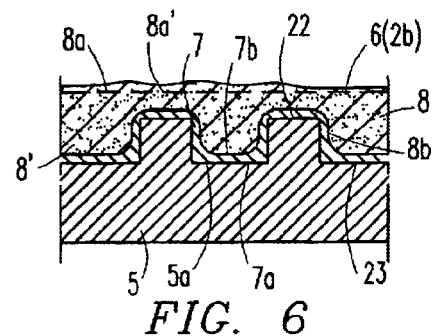
FIG. 6 is a sectional side view illustrating one example of a method of manufacturing a matrix in accordance with the invention matrix.

According to the present invention, the surface-carried positive microstructure 5a is covered with a thin wear-resistant first layer 7, shown in FIG. 6. This thin wear-resistant first layer 7 shall present an outer first wear-resistant surface 7a. The expression "wear-resistant surface" is intended to mean a surface against which the hot, flowing plastic material shall be pressed and against which the plastic element 3 shall be formed prior to being removed from the mould halves 1c, 1d.

The wear-resistant layer 7 that forms the first wear-resistant surface 7a will be sufficiently thin, for instance a thinness of 2 μm, for it to show a negative outer microstructure 2a that corresponds exactly to the positive microstructure 5a for the master 5.

The person skilled in this art is well aware of the fact that the methods and processes used in this regard will give different layer thicknesses and that it is necessary to choose a thickness and a method which will ensure that the area between said raised parts will be kept open.

The first wear-resistant layer 7 may be comprised of a plastic composite or some other hard material, although it is assumed in the following description by way of illustration that this thin, first wear-resistant layer 7 is comprised of metal.

The metal layer 7 can be applied with the aid of conventional techniques, for instance by sputtering or vapour deposition against a non-conductive master plate 5.

FIG. 6 is intended to show that this thin metal layer 7 can be applied to precisely cover the whole of the surface 5a allocated to the microstructure with a thin layer of metal In accordance with the requirements of the invention, the inner or upper surface of the thin metal layer 7 in FIG. 6 will present irregularities 7b that correspond substantially to the microstructure 5a.

According to the invention, these irregularities 7b are filled in a second stage with a selected plastic composite 8'. The plastic mass used for this plastic composite 8' should be hot and will be sufficiently fluid to fill all cavities or hollows 22 and cover all raised parts 21, 23 and therewith provide a flat upper surface 8a.

FIG. 6 is intended to illustrate an embodiment in which a plastic composite 8' is applied to form a carrier element 8 in a manner such that a small proportion 8a' of the plastic composite will be located over the plane 6 and a contemplated flat surface 8a, wherewith the excess plastic material 8a' can now be easily removed by a mechanical planning process.

The matrix 2, in the form of a carrier element 8 and a thin first wear-resistant surface 7a, is lifted out of or away from the master unit 5 and mounted in the moveable mould half 1c with the surface 2b (6) in abutment with the surface 1c'.

According to the invention, the plastic composite 8' that is used to form a carrier element 8 may conveniently be applied under pressure in a mould cavity in a manner such as to obviate the need of machining or mechanically working the rear side of the carrier element.

This third stage in the manufacturing process will be described in more detail below with reference to FIG. 9.

The use of a plastic composite 8' and a carrier element 8 formed therewith affords many adaptation possibilities. It is well known that different polymeric materials and mixtures thereof admixed with different fillers and mixtures thereof give different properties, and that selected curing processes and curing times influence the final properties of the plastic composite. This knowledge offers many different possibilities with respect to its application with a matrix in accordance with the invention For instance, a plastic composite 8' may be chosen from a polymeric material that has been mixed with a filling material, such as quartz-filled, metal-filled or carbon-fibre or other fibre or particle-filled epoxy or silicone polymers.

It is also proposed in accordance with the invention that the plastic composite 8' and a carrier element 8 formed therefrom can be chosen to have a coefficient of linear expansion or a thermal conductivity and/or a heat capacity that is adapted to a chosen process and/or to the nature of the machine used.

The plastic composite 8' may be chosen to cure in response to heat and/or through illumination with UV-light. These curing possibilities may be conveniently utilised so as to enable the plastic composite to be adapted to give the requisite hardness and stiffness.

The plastic composite used may be a bicomponent type.

Figure 7:
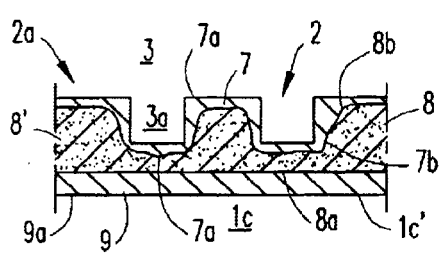
FIG. 7 is a sectional view of part of a first embodiment of a matrix produced in accordance with the invention.
Figure 8:
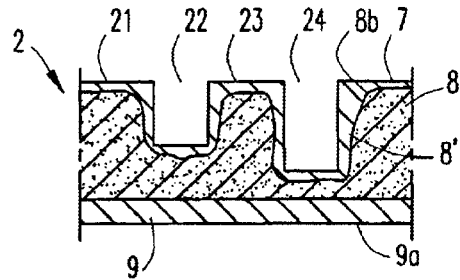
FIG. 8 is a sectional view of part of a second embodiment of a matrix in accordance with the invention.

FIGS. 7 and 8 are intended to illustrate that when a plastic composite 8' chosen to form a carrier element 8 located beneath the hard metal layer 7 forming a first wear-resistant surface 7a has an adapted low thermal conductivity (e.g. under 2 W/m/°K) and/or an adapted high heat capacity (obtained by having a preferably high specific heat capacity and/or a large mass), the plastic composite 8' and the carrier element 8 will function as a heat insulator against the mould half 1c, so that the plastic material pressed forward in the machine can be kept hot for the length of time taken for it to flow to and fill the most distant parts of the mould in order to form the microstructure pattern 3a in the plastic element 3.

In order to obtain an exact microstructure-related transfer, many applications require the heat and the temperature of the plastic material pressed into the mould to be maintained in said material without heat transferring to the mould half 1c too quickly.

According to the present invention, the matrix 2, shown in FIGS. 7 and 8, is coated with or has applied thereto a second wear-resistant layer 9 that provides a second wear-resistant surface 9a. This layer 9 is applied to the surface 8a of the carrier element 8 that faces away from the metal layer 7 and may consist of a hard-wearing layer and/or a heat-insulating layer.

The second wear-resistant layer 9 shall present to the surface 1c' of the mould half 1c a low-friction wear surface 9a of high abrasive resistance, since the pressure between the matrix 2 and the mould half 1c is high during the casting or moulding process and thermal stresses tend to displace the matrix 2 relative to said mould half 1c.

The second wear surface 9 may, in this case, conveniently comprise titanium nitride or diamond-like-carbon (DLC).

In certain applications, the material used to form the second wear layer 9 may be the same material as that used to form the thin, first wear-resistant layer 7a, with a plastic carrier element 8 placed therebetween.

The thin metal layer 7 can be applied by a sputtering process and/or by vapour deposition, or by a plating or cladding process.

FIG. 8 illustrates an alternative embodiment which includes an abrasion-resistant second wear layer 9, a carrier element 8 formed by a plastic composite 8' and a thin, first wear-resistant layer in the form of a metal layer 7, where a cavity or hollow 22 has the dimensions shown in FIG. 4, whereas an adjacent hollow or cavity 24 is much deeper than said cavity 22. A carrier element 8 having a carrier surface 8b for the thin first wear-resistant layer 7 and/or said layer 7 may comprise a plastic composite 8' having a coefficient of linear expansion and/or a thermal conductivity and/or a heat capacity adapted to a chosen process and/or to the design of the moulding machine used. Preferably the coefficient of linear expansion is lower than $1\times10^{-5}/°K$ so that the moulded structure does not change shape too much when exposed to the extremes of temperature found in plastic element manufacturing processes.

The carrier element 8 may also be comprised of a plastic composite that can be given different degrees of hardness, by applying different degrees of heat and/or by irradiation with UV-light.

The carrier element 8 may also be comprised of a material that has a low thermal conductivity and a high heat-insulating and/or heat capacity in order to prevent it absorbing too much heat energy from the hot plastic mass.

The carrier element 8 may also be reinforced with known means. For instance, the carrier element 8 may be strengthened with a further anti-wear layer 9 on the surface thereof that lies distal from the metalled surface 7.

Although the invention has been described above with reference to an embodiment in which a thin wear-resistant layer 7 is supported by a thicker plastic layer or carrier element 8, it is suitable in certain cases to form these two wear-resistant layers from one and the same plastic material.

There is nothing to prevent the wear-resistant layer 7 from curing first, preferably to a high degree of hardness, and curing the supportive plastic layer or carrier element 8 at a later time to a lower degree of hardness.

Figure 9:
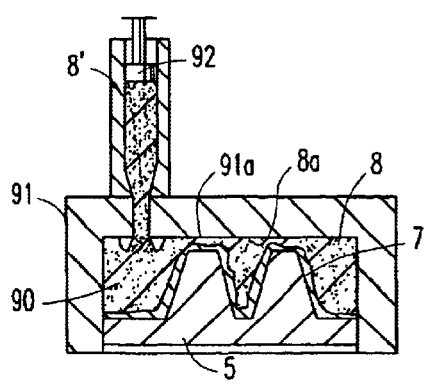
FIG. 9 illustrates the use of a mould cavity for producing a matrix that has a flat rear surface.

As illustrated in FIG. 9, the plastic composite 8' may be applied to a mould cavity 90 in the form of a casting matrix or mould 91 with the aid of an overpressure exerted by a plunger 92, so that the surface 8a of the carrier element will be made flat by the surface section 91a of the mould 91.

This flat surface 8a can now be applied directly to the support surface 1c' of the mould half 1c.

With regard to the thickness of the layer 7, a basic rule is that the thickness will be sufficient to prevent a collapse or crack formation occurring during a chosen number of casting or moulding processes. This means, in practice, a thickness of 1–5 μm.

More generally, the thickness may range between 1 and 50 μm, and will preferably be less than 20 μm.

In certain applications, however, the layer may have a thinness of about 0.1 μm, depending on the material from which the carrier element 8 is formed, among other things.

The thickness of the wear layer 9 may be between 1 and 50 μm, preferably less than 20 μm.

The depth variation of the microstructure 1a may vary between 0.1 and 1000 μm, and will preferably be above 100 μm.

In a further embodiment of the present invention, the matrix 2 is provided with means for improving the replication of its microstructure 2a on the plastic element 3. As mentioned above, the matrix 2 in a known way is provided on one surface with a layer 7 having a negative surface structure 2a and against which negative surface structure 2a a positive surface structure 3a belonging to a plastic element 3 is formed.

The manufacturing of the plastic element 3 occurs principally through the mould half 1c and 1d taking up a joined together position and thereby forming said mould cavity 1e. *Before the moulding sequence, the mould halves 1c and 1d are heated in order to facilitate the distribution and the filling of the mould cavity 1e by a heated plastic mass (approximately 400° C.).*

Normally the mould halves 1c and 1d and the matrix 2 are given a considerably lower temperature than the plastic mass and there is a risk that a hot (say approximately 400° C.) plastic mass does not manage to fill the mould cavity 1e and flow out to the edges before the plastic mass solidifies against the surface 2a of the matrix 2. Subsequently the plastic mass is cooled so that at least the surface structure 3a of the plastic element is solid (say approximately 140° C.) and then the mould halves 1c and 1d are opened and the plastic element ejected (in accordance with FIG. 3). In practice, the method requires a rapid temperature change and the cycle times for the manufacture of plastic elements 3 are strongly dependent on the speed and the efficiency of this temperature changing.

The present invention is based upon that a required heating shall take place in the surface structure belonging to the layer 7 of the matrix 2 or in a layer situated close to this layer and especially that the necessary heating should be able to be concentrated to the parts where a risk for a incomplete filling is specially imminent with increased production speed.

The invention now suggests that the used mould halves 1c and 1d, and also a part of the matrix 2, shall through having a more or less constant application of cooling means be given a comparatively low temperature in order to be present as an available cooling capacity immediately after the end of a moulding process. The lower that this temperature is, the quicker the cooling, but in practice a temperature of 80° C. is preferable with a plastic solidification temperature of 140° C. In practice, a suitable temperature difference between the solidifying temperature of the plastic material and the temperature of the mould halves should be between 40–100° C., such as approximately 50–70° C., in an application in accordance with the present invention.

The whole of the layer 7 of the matrix 2 or in any case one or more local parts thereof shall be preheated via an electrical production of heat to a suitable moulding temperature immediately before the commencement of the moulding process.

In practice, it is so that the layer 7 is heated up by the hot plastic mass when this plastic mass is injected into the mould cavity. In the region around the cavity inlet 1f, the region 21a, the injected plastic mass 1p will keep the layer 7 hot so that a complete filling will take place despite the cooling effect of the matrix layer 7. For more peripheral surface sections, such as the region 21b, the injected plastic mass 1p will have been cooled down by the layer 7 and it is within this region that a incomplete filling occurs because of an extremely thin plastic layer, a skin layer, solidifying against the layer 7 of the matrix 2. It is in order to eliminate the occurrence of such skin layers 1s that the present invention relates to a local heating of the layer 7 of the matrix 2 in at least the region 21b.

The layer 21b of the matrix normally does not need to have a very high temperature from the local heating and a temperature around or something over the actual solidification temperature is normally sufficient. The invention can however offer a temperature for the region 21b of the layer 7 which can be up to an extremely high temperature, say over 200° C.

The arrangement belonging to the matrix in accordance with the invention, is further based upon the use of a heating means 4, in order to, in the first instance, for a short duration of time, supply said matrix 2 and/or the selected region (21b) with a requisite heat energy.

The necessary cooling can take place through keeping the mould halves 1c and 1d constantly cold via a (not shown) cooling means.

The invention can be considered such that immediately before, and preferably during, the moulding process the electrical heat energy should be supplied to form a thin heat layer between the matrix surface 2a and the mould half 1c in order to facilitate good filling of the mould by the hot plastic mass.

When the electrical heat energy is disconnected the matrix surface 2a and the layer 7 are quickly cooled down to a temperature below the solidifying point for the plastic mass through the low temperature which is being selected to be in force on the mould halves rising up through the layer 7 and the hot plastic element 3 present in the mould cavity 1e. In this way, the cycle time for the manufacture of each such plastic element 3 is reduced.

Figure 10:
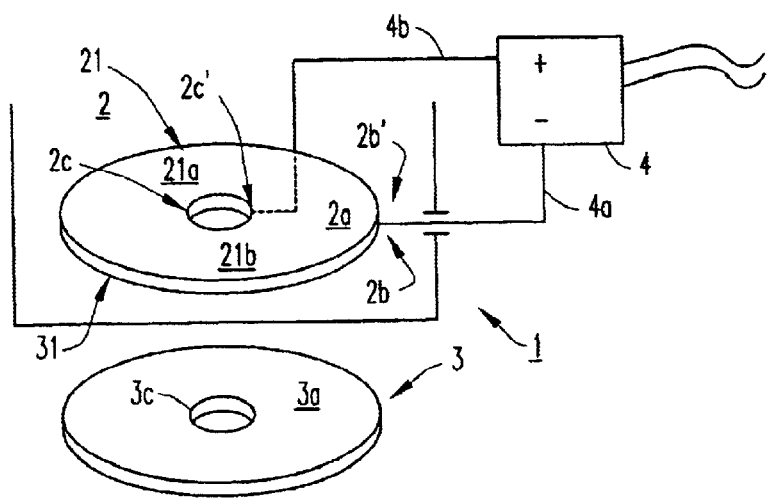
FIG. 10 shows in a perspective view the injection moulded plane plastic element, in the form of a CD-disk, at a distance outside the moveable mould half provided with a matrix.

FIG. 10 shows that the one connection wire 4a of the heating means 4 is connected to the outer peripheral edge 2b of the matrix 2 and the other connection 4b is connected to the central edge 2c of the matrix as connection points 2b' respectively 2c'.

It is assumed that these connection points 2b' and 2c' are connected to the layer 7 which can be electrically conducting or to one or more underlying layers such as 31, 41, 42 and 52 which can be electrically conducting or semiconducting.

With reference to the FIGS. 11–14 the present invention's specific characteristics will now be closely illustrated through describing a number of different materials and constructions for the negative surface structure 2a of the matrix 2 and the layer 7 with the adjacent underlying layers.

The following description comprises for the sake of simplicity only the layer 7 and a number of layers belonging to the matrix situated close to this layer.

Heating means 4 referred to in accordance with the invention is the supply of electrical heat energy to the whole or selected parts of the matrix 2 and directly or indirectly to the layer 7, and via a switching means (not shown) heat energy is supplied immediately before and during the injection moulding process in order to keep the walls of the matrix hot and thereby facilitate that the hot plastic mass flows out.

The connection shown in FIG. 10 for manufacturing a circular disk 3 (e.g. a compact disc) implies a higher current density and a higher heat emission from the surface part 21a of the layer 7 adjacent the central edge of the hole 2c than within the peripheral edge 21b and the surface region 21b.

This condition actually counteracts the primary necessity since a further heating of the surface part 21a can hardly be considered necessary.

Heating up of the part of the surface 21b is on the other hand necessary. A first possibility for this is offered by overheating the surface section 21a in the aid of an adapted heat supply to the surface section 21b when layer 7 is essentially evenly thick.

Another possibility is to allocate different thicknesses to the layer 7 with a thinner layer across the direction of current in the surface section 21b than in the surface section 21a and with a thereof guaranteed increased heat development in the surface section 21b.

Figure 11:
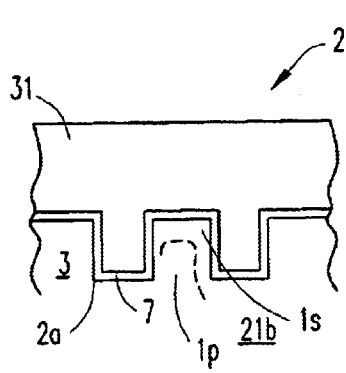
FIG. 11 shows a cross-section a first embodiment of a negative surface structure of a matrix.

Preferably said electrical heat energy is applied via or immediately next to the layer 7 of the negative surface structure 2a belonging to the matrix and FIG. 11 illustrates an embodiment where the electrical heat energy can be supplied only via the thin layer 7 of the surface structure 2a.

The optimal thickness of the layer 7 depends on the selected manufacturing process, selected plastic material, design of the matrix, selected concentrated heat production within the selected partial regions and many other criteria. Practical experience shows that in many applications the thickness should be selected to be less than 20 $\mu$m, say 2–10 $\mu$m, or up to 5 $\mu$m.

With the electrical connections shown in FIG. 11, if layer 7 is made of just one type of material then more heat will produced in the central part 2c while a lesser energy production will occur in the peripheral part 2b due to the differing current densities. Such an embodiment should possibly be especially suitable if the microstructure around the central edge 3c in the element 3 is sensitive to the moulding conditions and, therefore, in order to obtain a good replication capacity and mould filling, a higher temperature of the plastic mass and the matrix is required there than in the peripheral region.

A suitable precondition for the present invention is furthermore, according to FIG. 11, that said layer 7 having the negative surface structure 2a and/or a layer 31 supporting this layer 7 consist(s) of an electrically conducting or electrically semi-conducting material.

When connected in accordance with FIG. 10 the connection points 2b' and 2c' can be connected to just layer 7, just layer 31 or to both layers 7 and 31. The layer 31 can consist of an electrically conducting polymer. The layer 7 having the negative surface structure belonging to the matrix is preferably made of a material, such as nickel, with a resistivity of between 0.025 and 0.12 Ohms×mm$^2$/m.

The local heat production across the direction of the current flow can be regulated through locally changing the thickness (and consequently the cross-sectional area) of the layer 7, with a thinner layer of material where a higher heat production is required and a thicker layer of material where a lower heat production is required. Regard should be paid to the current density occurring in the material to prevent it being damaged.

Figure 12:
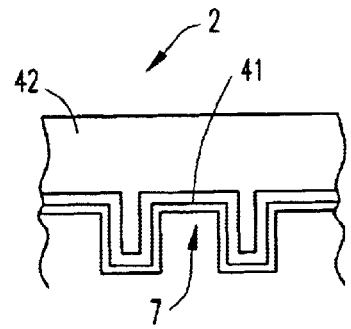
FIG. 12 shows a cross-section of a second embodiment of a negative surface structure of a matrix.

Said layer 7 having the negative surface structure belonging to the matrix is, in FIG. 12, supported by a layer 41 with a resistivity of 0.03 Ohms×mm$^2$/m or less. The thickness of the layer 41 should be selected depending on the relevant criteria, in the same way as for the layer 7. Practical experience shows that in many applications the thickness should be selected to be less than 20 $\mu$m, preferably thinner than 10 μm and advantageously up to 5 μm. The layer 41 can advantageously be made of gold, silver or the like.

A further supporting layer 42 can be formed of a heat producing and/or supporting layer, where said supporting layer 42 can consist of a material with high resistivity. An electrically conducting polymer can also be used here.

Figure 13:
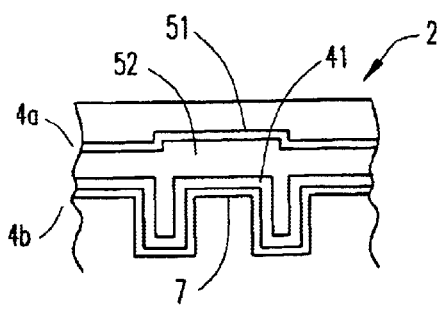
FIG. 13 shows a cross-section a third embodiment of a negative surface structure of a matrix and FIG. 14 shows a cross-section of a fourth embodiment of a negative surface of a matrix.

FIG. 13 shows a layer 52 having a high resistivity intermediately positioned between two thin layers 41, 51 that each have a low resistivity.

FIG. 13 also shows that the layer 7 can be the same as the layer 7 according to FIG. 11, that the layer 41 can be the same as the layer 41 in FIG. 12 and that a supporting layer 42 can be formed from the further supporting layer 52. It is especially advantageous that the layer 52 can have different thickness (i.e. varying cross-sectional areas), thicker at sections which require low heat energy and thinner at sections which require higher heat energy. In this embodiment, the voltage from the heating means 4 is connected to layers 41 and 51.

The invention has a special application where the layer 7 having the negative surface structure 2a belonging to the matrix has the form of a microstructure 2a and this microstructure 2a is to be transferred to the plastic element 3 as a positive micro-related surface structure 3a. In this application it is especially important to allow the heat production to be adapted to be higher at some selected surface sections belonging to the matrix than at other surface sections in order to thereby increase the replication accuracy and degree of mould filling or mould filling capacity.

Figure 14:
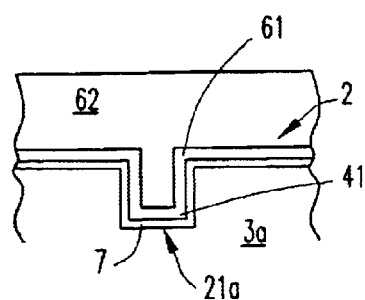

FIG. 14 shows a further embodiment of the present invention. The practical application here also requires dimensional variations within wide ranges. The thickness of the layer 7 should be selected to be less than 10 μm, say 2–8 μm. As an example, the layer 7 here consists of up to 5 μm thick titanium nitride which gives a hard surface 21a respectively 21b against the plastic element 3 and has good wear—and release characteristics. The layer 41 can consist of an up to 300 μm thick nickel layer that gives a hard coating and forms a support and carrier for the layer 7. Nickel is relatively cheap and can be considered to have acceptable electrical conductivity. The layer 61 should consist of a material with good electrical characteristics such as gold, silver, copper. The thickness of this layer should be thin, say less than 10 μm, for example 2–8 μm and preferably under 5 pm. The supporting layer 62 can be made of a polymer material which can be plated and which acts as a heat shield. These layers can be applied advantageously with known techniques such as surface deposition, plating, casting, spinning, spray painting or via vacuum deposition techniques such as sputtering or vaporisation.

It will be understood that the invention is not restricted to the present described and illustrated exemplifying embodiments thereof and that modifications can be made in accordance with the concept of the invention as defined in the accompanying claims. Furthermore, features shown in the individual embodiments described above may be combined with features from other embodiments, thus, for example, the heating means of the present invention may be combined with any suitable layers and carrier elements of the present invention.

What is claimed is:

1. A matrix for use in the replication of a plastic element having a positive microstructure, comprising a first wear-resistant layer, wherein said layer is supported by a carrier element having a thermal conductivity of less than 2 W/m/°K, wherein said layer consists of an electrically conducting or semi-conducting material having a resistivity of between 0.025 and 0.12 ohms×mm²/m, wherein said matrix is in the form of a singular structure mould cavity insert and is connected to a source of electrical heat energy via the first wear-resistant layer or a layer supporting the first wear-resistant layer by a connecting means.

2. The matrix of claim 1, wherein the carrier element has a resistivity of less than 0.3 ohms×mm²/m.

3. The matrix of claim 1, wherein the carrier element has a resistivity of less than 0.03 ohms×mm²/m.

4. The matrix of claim 1, wherein the carrier element is capable of producing heat.

5. The matrix of claim 1, wherein the electrical heat energy is supplied by applying a voltage to the electrically conducting or semi-conducting material of the first wear-resistant layer.

6. A plastic element producing machine including the matrix of claim 1, wherein said machine is a compression moulding, an injection moulding or an embossing machine.

7. A method for the manufacture of a plastic element having a surface with a positive microstructure comprising the steps of:

(i) providing the matrix of claim 1; and (ii) replicating said plastic element on said matrix while supplying heat energy to the electrically conducting or semi-conducting material of the first wear-resistant layer during the filling of the matrix mould cavity with molten plastic.

8. The method of claim 7, wherein step (ii) is performed in a plastic element-producing machine based on replication of the matrix.

9. The method of claim 8, where said plastic element-producing machine is a compression moulding, an injection moulding or an embossing machine.

10. The method of claim 8, wherein said first wear layer is a metal layer.

11. The method of claim 8, wherein said plastic element is an optical disc.

12. The matrix of claim 1, wherein said carrier element comprises a polymer material that acts as a heat shield.

13. The matrix of claim 1, wherein said carrier element comprises a plastic composite.

14. The matrix of claim 1, wherein said first wear-resistant layer has a thickness ranging between 1 and 50 μm.

15. The matrix of claim 1, wherein said first wear-resistant layer is a metal layer.

16. The matrix of claim 1, wherein said first wear-resistant layer exposes an inverse microstructure on its surface having a depth variation ranging between 0.1 and 1000 μm.

* * * * *